United States Patent [19]
McClelland, III et al.

[11] 3,878,391

[45] Apr. 15, 1975

[54] RADIOMETRIC PULSE INITIATOR HAVING A REFLECTIVE PATTERNED DRUM

[75] Inventors: Theodore M. McClelland, III; Joseph M. Keever, both of Raleigh, N.C.

[73] Assignee: Westinghouse Electric Corporation, Pittsburgh, Pa.

[22] Filed: Dec. 17, 1973

[21] Appl. No.: 425,669

[52] U.S. Cl. .................. 250/233; 250/570; 324/97
[51] Int. Cl. ............................................. G01d 5/36
[58] Field of Search...... 250/233, 209, 570, 231 SE; 324/96, 103 X, 97, 142; 178/7.1

[56] References Cited
UNITED STATES PATENTS

| | | | |
|---|---|---|---|
| 3,114,081 | 12/1963 | Whipple | 250/233 X |
| 3,311,824 | 3/1967 | Pitt | 324/103 X |
| 3,351,744 | 11/1967 | Masterson | 250/233 X |
| 3,371,214 | 2/1968 | Berryman | 250/209 X |
| 3,733,493 | 5/1973 | McClelland | 250/233 |

*Primary Examiner*—Walter Stolwein
*Attorney, Agent, or Firm*—R. W. Smith

[57] ABSTRACT

An improved radiometric pulse initiator for three wire remote meter telemetry systems includes interchangeable reflective patterned drums provided with alternative preselectable numbers of reflecting segments for generating desired pulse rate in response to a predetermined amount of rotation of a watthour meter movement.

8 Claims, 9 Drawing Figures

RADIOMETRIC PULSE INITIATOR HAVING A REFLECTIVE PATTERNED DRUM

CROSS REFERENCE TO RELATED PATENTS

This invention is related to U.S. Pat. No. 3,733,493 issued May 15, 1973 to T. M. McClelland, and assigned to the assignee of this invention.

BACKGROUND OF THE INVENTION

This invention relates to radiometric pulse initiators for pulse operated remote meter reading and totalizing systems and more particularly to such pulse initiators having an improved rotating reflective pattern arrangement for periodically establishing reflected optical paths for optically coupling radiation responsive source-pickup pairs to precisely generate electronic pulses.

Pulse initiators are used, particularly in the electrical power metering field, for developing output pulses which in turn initiate data pulses over a three wire telemetering system. These data pulses are directly responsive to predetermined increments of movement in integrating type meters such as watthour and watt demand meters. A radiometric solid state pulse initiator is described in U.S. Pat. No. 3,733,493 issued May 15, 1973 to McClelland, III, and assigned to the assignee of this invention. Earlier photoelectric pulse initiators of a similar general type are described in the Instructional Bulletin IL 42-950.4 dated December, 1969 available from the Westinghouse Electric Corp., Meter Division, Raleigh, N.C.

The prior pulse initiators of the aforementioned three wire telemetry types include two photoelectric or radiation responsive, also referred to as radiometric, source-pickup pairs that are connected in an electronic pulse generating circuit. The circuit is operated in response to a meter movement which rotates a pattern of discrete reflecting areas or segments. The reflective patterns in the prior arrangements have been provided directly on the disk of a watthour meter movement or on a small auxiliary patterned disk. The patterns have also been formed by combinations of reflecting flat vanes. The auxiliary patterned disks and reflecting vanes are driven by a gear train system coupled to the main disk shaft of watt-hour type meters. The number of reflecting segments (S) in each of two rows of segments defining the pattern and the gear ratio (Pg) of the gear train system determines the output pulse rate for a predetermined number or fraction amount of a meter shaft revolution (pulse/rev.). Conventionally, a meter shaft movement per pulse (rev./pulse) is designated by the constant Mp and is the reciprocal of the output pulse rate. The value of Mp is determined by the formula Mp=Pg/2S. The number of segments in each row (S) is multiplied by two because there are two pickups, each associated with a different row in three wire telemetry systems.

In a watthour meter, the electrical energy (watthours) flowing through the meter produces the meter disk shaft rotation so that a number of kilowatt hours is represented by each shaft rotation (kwhr/rev.) and is conventionally designated by a watthour constant kh for the meter. The electric energy represented by each pulse (kwhr/pulse) is conventionally designated Ke. Accordingly, the pulse energy value Ke is determined by the product of Mp constant times the Kh constant or Ke = Mp × Kh, neglecting any additional ratio factors due to potential or current transformers which connect the meter to the measured power lines.

With increased use of remote electrical energy metering, and recording it is increasingly desirable to offer more variations in the available pulse rates and values for the pulse energy (kwhr/pulse) value Ke. This requirement arises since pulses may now be received at higher rates such as when magnetically recorded as subscribed in U.S. Pat. No. 3,059,239, issued Oct. 16, 1962 to Snyder and assigned to the assignee of this invention, for automatic processing by various high speed automated and computer controlled billing and data translating apparatus and systems. It is further highly desirable to have higher output pulse rates, i.e., lower Ke energy values, for increased accuracy and pulse resolution where the pulse monitored watthour and watt demand meters are measuring high levels of power consumption.

The use of electronic pulse initiators of the photoelectric or all solid state radiometric types, have become more desired to replace the substantially longer used electromechanical contact device types. In the aforementioned Instructional Bulletin IL 42-950.4 two general types of electronic pulse initiators are described. In one type, the reflective pattern on the meter disk may provide variable numbers of segments up to a maximum of five per row for operation at maximum meter capacity. Since the pattern is always rotated in the latter arrangement at the speed of the meter shaft, this permits only variations in ratios from 1 to 5 in the meter shaft revolutions per pulse (rev./pulse) constant Mp.

In the other general type described in the above-identified Instructional Bulletin a gear train system is included to drive the flat reflecting vanes which define a pattern of reflecting segments. A gear train system is also utilized to drive the auxiliary disk in the pulse initiator described in the above-identified U.S. Pat. No. 3,733,493 which is an improvement over the reflecting vanes. The rotating reflective patterns, the gear train and a sensing head having the photoelectric or radiometric source-pickup pairs are all parts of a pulse initiator. These parts are mounted to the associated meter movement within the very limited and compact space that is available in the watthour meter or combined watthour and watt-demand meter enclosures.

Further limitations to design of pulse initiators include the maximum permissible frictional loading of the gear train system on the meter shaft. Additional complexities are also encountered with variations in the watthour constants Kh of different watthour meters, the high degree of reliability required for generating highly accurate pulse rates with constant use over very long apparatus lifetimes, the optical orientations and alignments of the light or radiation responsive sources and pickups relative to each other and to the reflective segments, and the maintenance of optical sensitivity and isolation during operations in both dim and extremely brightly lighted ambient conditions.

With the above considerations in mind, achievement of a desired pulse energy value Ke is made by selecting the meter rev./pulse constant Mp in pulse intiators in accordance with the formula ke = Mp × Kh for a fixed watthour constant Kh of a given meter. This is done by changing either the gear train ratio, Pg or the number of reflecting areas or segments S in each row of the reflective pattern in accordance with the formula Mp = [Pg/2(S)].

A limitation upon selection of the gear ratio Pg is illustrated in FIG. 14 on page 9 of the above-identified Instructional Bulletin which indicates that the gear train frictional loading imposed on a watthour meter shaft increases sharply as the gear ratio Pg is adjusted from a ratio of 5:1 to a substantially practical limit of approximately 2:1 to obtain a lower pulse energy value Ke.

Further adjustment to lower the Ke value and increase the output pulse rate is provided by increasing the number of segments in the reflective pattern. A reflective pattern of flat vanes is generally limited to either two, four or six vanes and is further less desirable due to expense and difficulty in manufacture, assembly and alignment. Also, flat vanes have been found to be not highly selective in optical reflectivity especially when operated in some adverse ambient light conditions which is due, in part, to the greater spacing required between the vanes and the source-pickup pairs for rotational clearance.

The use of an auxiliary reflective pattern disk as described in the aforementioned U.S. Pat. No. 3,733,493 has been found superior in optical reflectivity and sensitivity to the reflective vanes in many applications. Further advantages are the simpler cost and construction of the patterned disk and ease with which the number of segments may be varied on different disks.

In attempting to extend the number of reflecting segments of the auxiliary disk patterns to adjust for lower Ke values, several limitations have been noted. First, due to the minimum quantum of radiant energy required to be reflected from the generally truncated triangular shaped disk reflecting segments which have generally radially extending sides, the sides must be maintained at predetermined minimum arcuate distances apart to provide minimum reflective areas. Due to some spurious scattering of the source radiations in the source-pickup pairs and scattering of external light, these segments are required to be separated by a predetermined arcuate distance of a non-reflecting space. Accordingly, to substantially increase the number of the patterned disk segments, the disk diameter must be made to exceed the circular space available within the meter enclosures. For example, it has been found that the diameter of gear driven auxiliary patterned disks cannot practically exceed about one inch in diameter and the arcuate distance between reflecting segments must be at least 0.05 inch. This has been found to make the substantial increase in the number of reflective segments on a patterned disk impractical thereby limiting the use of such patterned disk.

SUMMARY OF THE INVENTION

In accordance with the present invention a radiometric pulse initiator for remote meter reading telemetry systems includes a pattern of reflecting segments placed on the cylindrical side surface of a drum which is rotatably coupled through a gear train system to the shaft of a watthour meter movement. A large number of preselectable reflecting segments are positioned in two circular staggered rows. A sensing head carrys two radiation source-pickup pairs positioned along a diametrical plane of the drum and facing the cylindrical side surface. Rotation of the drum progressively defines thin convex cylindrical reflecting segmental portions along each segment to reflect radiations along an optical path coupling each source-pickup pair of the sensing head.

It is an important feature of this invention to provide an improved pulse initiator for remote meter reading telemetry systems having a compact size for mounting within a watthour meter and including a gear train system which provides variable fixed gear ratios for coupling the meter shaft and a reflective patterned drum which is interchangeable with drums having different preselectable numbers of reflecting segments for providing desired output pulse rates wherein each pulse has a predetermined energy value.

It is a further feature of this invention to provide a pulse initiator having a patterned drum which provides a maximum number of reflecting segments circumferentially spaced in accordance with a minimum of circular area such as available in a watthour meter. It is a still further important feature of this invention to provide a reflective pattern of circumferentially spaced segments which may be disposed with decreased non-reflecting spaces therebetween while maintaining effective deadband spacings which prevent undesired triggering of the radiation sensitive source-pickup pairs due to reflecting segments formed on a cylindrical side surface of a rotating drum. Other advantages and features of this invention will be apparent from the description of the drawing.

DESCRIPTION OF THE PREFERRED EMBODIMENT

Figure 1:
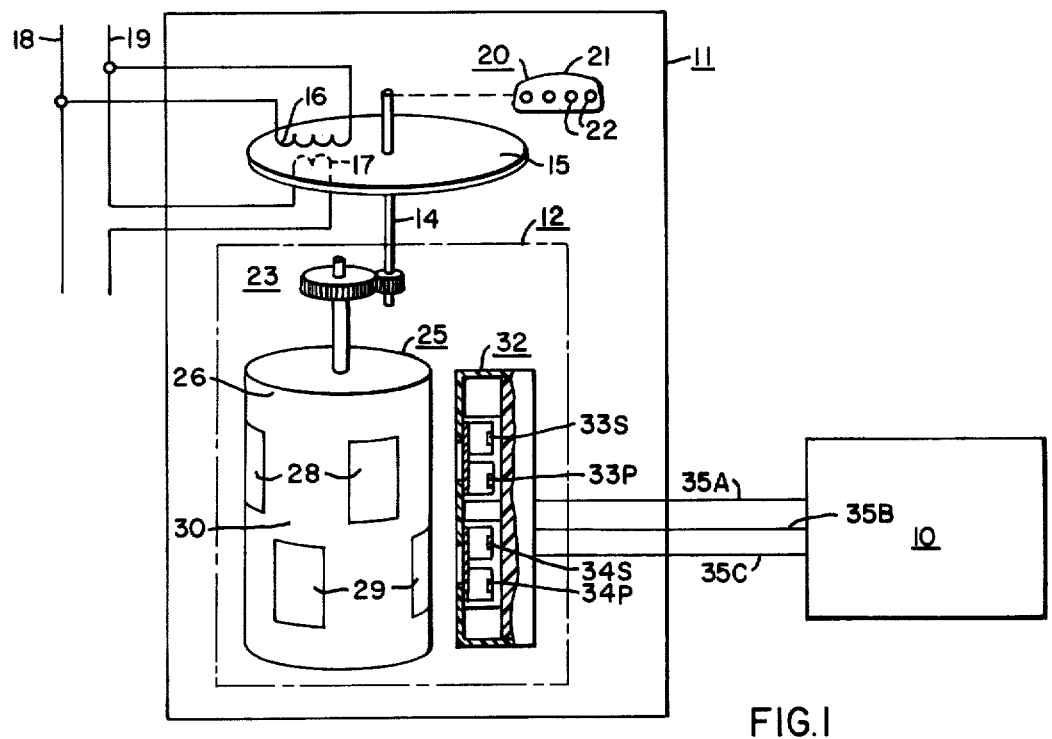
FIG. 1 is a schematic view of the remote meter reading system including an improved radiometric pulse initiator having a reflective patterned drum assembly made in accordance with this invention.

Referring now to the drawings wherein like numerals are used to designate similar to like parts in the several figures, and more particularly to FIG. 1, wherein there is illustrated a schematic view of a remote meter reading telemetry system 10 for monitoring a watthour meter 11. The system 10 may correspond to that described in the above-identified U.S. Pat. No. 3,733,493 and includes a radiometric pulse initiator 12 made in accordance with the present invention which is an improvement of a pulse initiator described and claimed in the aforementioned patent.

The watthour meter 11 is a well known integrating type including an electroresponsive meter movement having a rotatable shaft 14 which carries an electroconductive disk 15 and includes at least one each of a potential coil 16 and current coil 17. The coils 16 and 17 are connected to power line conductors 18 and 19 so as to electromagnetically drive the disk 15 at a predetermined rotational rate corresponding to the energy supplied through the conductors 18 and 19. Typically, the meter 11 has a register 20 driven by the shaft 14 and the register dial plate 21 with pointers 22 indicates the electrical energy consumption in kilowatt hours.

The pulse initiator 12, as described in particular detail hereinbelow, includes a gear train system 23 coupling the rotation of the meter shaft to an interchangeable reflective patterned drum assembly 25 forming an important feature of this invention. A cylindrical drum side surface 26 has two staggered rows of reflecting segments 28 and 29 surrounded by a non-reflective area 30 substantially covering the remaining area of the cylindrical side surface 26. A sensing head 32 includes two solid state radiation responsive source-pickup pairs 33S and 33P and 34S and 34P and an electronic pulse initiating circuit, not shown, as described in the aforementioned U.S. Pat. No. 3,733,493. A cabling harness 35 has three wire conductors 35A, 35B and 35C for connecting the pulse initiator 12 to the telemetry system 10 to deliver output pulses having a predetermined kilowatt hous energy value (kwhr/pulse) Ke as described hereinbelow.

Figure 2:
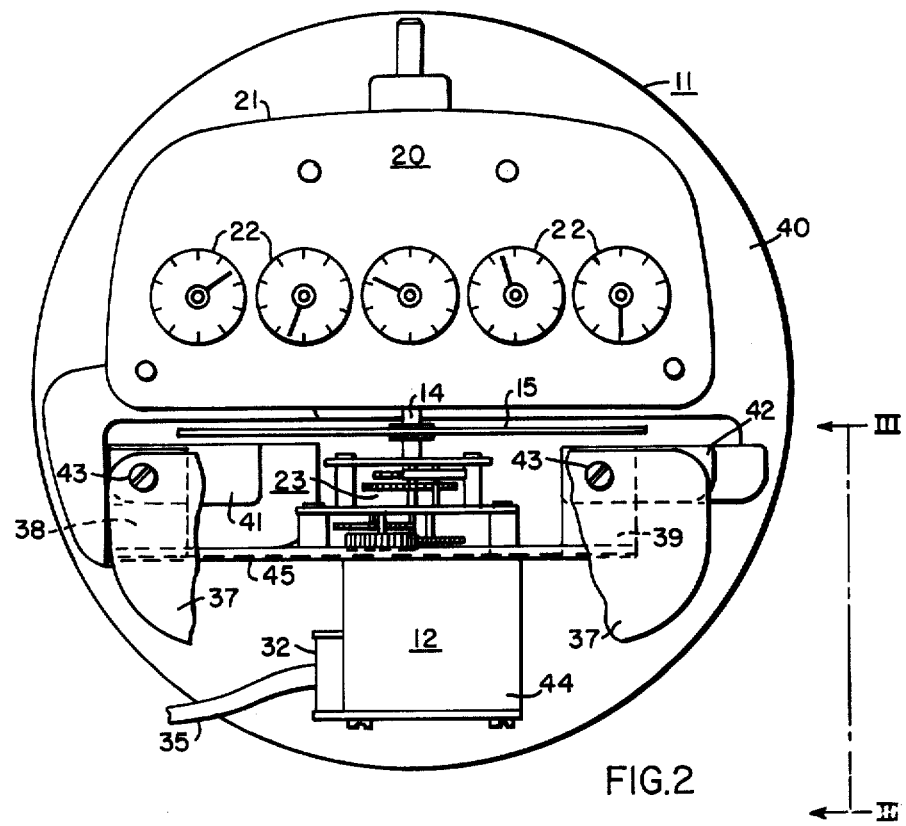
FIG. 2 is a front elevational view of a watthour meter movement illustrated in FIG. 1.

FIG. 2 is a front elevational view of the watthour meter 11 shown in FIG. 1 with parts removed to illustrate the orientation of the pulse initiator 12. The pulse initiator includes a support assembly carrying the principal operating parts at the front lower portion of the meter 11 behind the nameplate 37 and in front of the shaft 14. A pair of L-shaped mounting brackets 38 and 39 attach the pulse initiator 12 to the meter frame 40 at the ends of a pair of spaced forward projecting bosses 41 and 42 formed in the frame 40. The brackets 38 and 39 are secured to the bosses 41 and 42 by screws 43 normally provided for attaching the nameplate 37. The gear train system 23 is oriented at the top of the pulse initiator 12 and a light shielding cover 44 surrounds the drum assembly 25 and the sensing head 32 with the conductors 35A, 35B, and 35C extending therefrom.

Figure 3:
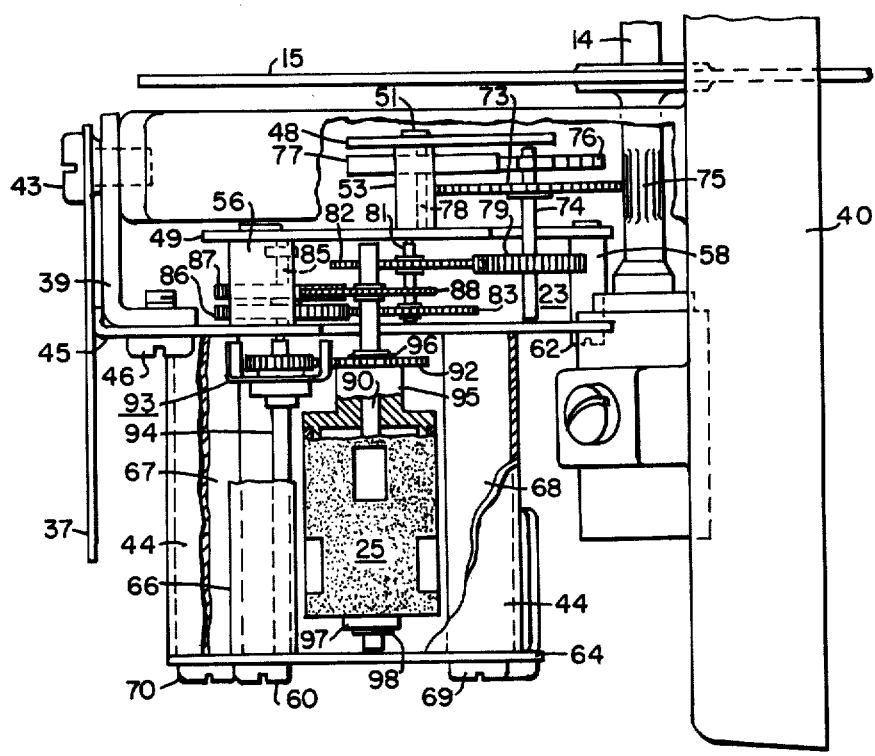
FIG. 3 is an enlarged fragmentary view of the lower portion of FIG. 2 taken along axis III—III and looking in the direction of the arrow with portions thereof broken away.
Figure 4:
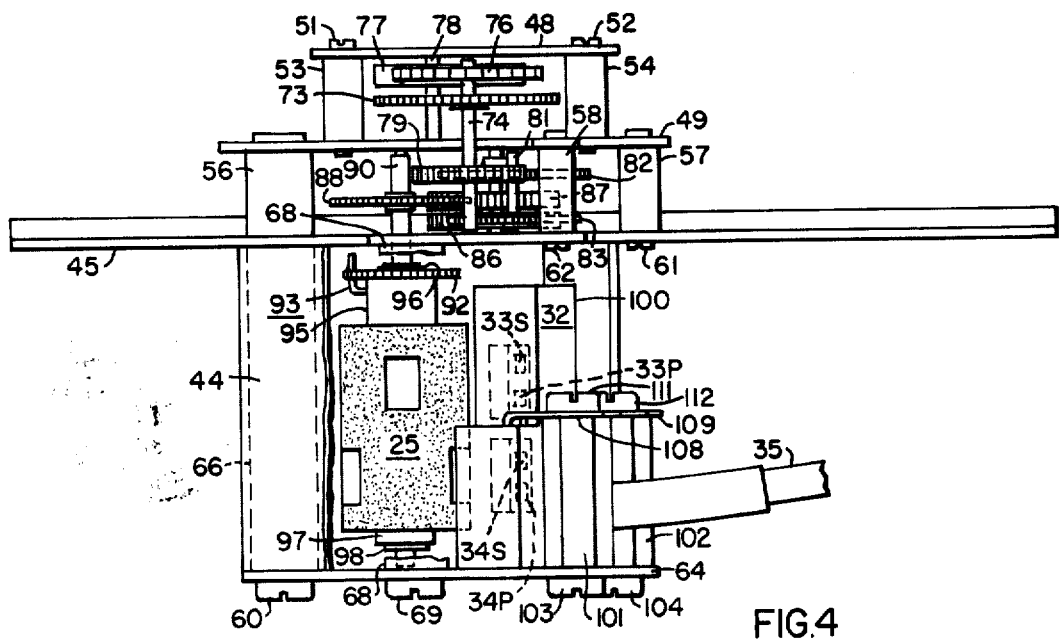
FIG. 4 is a rear elevational view of a pulse initiator shown in FIG. 3 with parts removed.
Figure 5:
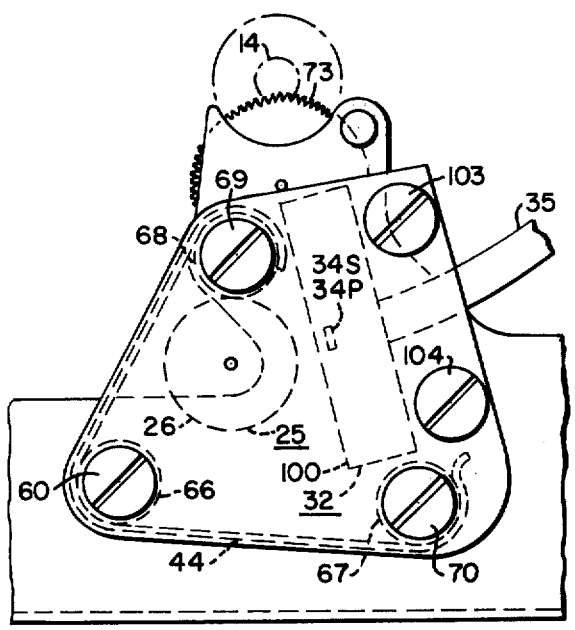
FIG. 5 is a bottom elevational view of a pulse initiator shown in FIGS. 3 and 4 with parts removed.

Referring now to FIGS. 3, 4, 5 wherein the details of the pulse initiator 12 are illustrated, and initially referring to FIG. 3 wherein there is shown a side elevational view taken along axis III—III in FIG. 2 with parts removed of the pulse initiator 12 and the lower portion of the meter 11. The bracket 38 is shown mounted to the frame boss 41 by one of the screws 43 also attaching the nameplate 37 to the meter frame 40. A horizontal main plate 45 of the support assembly extends between the brackets 38 and 39, as shown in FIG. 2 and is fastened thereto by screws 46. An upper plate 48 is fastened in a substantially horizontally parallel relationship to a middle plate 49 by screws 51 and 52 and spacer tubes 53 and 54. The middle plate 49 is secured, in turn, to the main plate 45 by spacer tubes 56, 57 and 58 and associated screws 60, 61 and 62, respectively.

A bottom plate 64 is provided in addition to the above-identified upper and middle plates 48 and 49 below the main plate 45 and is secured thereto by three spacer tubes 66, 67 and 68 and screws 69 and 70 extending through the tubes 68 and 67, respectively, and the aforementioned screw 60 which extends through the tube 66. Thus assembled, the upper plates 48 and 49 in combination with the main plate 45 provide support for the gear train system 23 and the bottom plate provides support for the lower end of the drum assembly 25 and the sensing head 32.

Referring now in detail to the gear train system 23 as shown in FIGS. 3 and 4, an input gear 73 of the system 23 is fixed to a first shaft 74 which has the opposite ends thereof rotatable between the plates 45 and 48. The gear 73 is adapted to mesh with longitudinal serrations 75 formed in the shaft 14 below the disk 15 as shown in FIG. 3. A detent assembly including a rachet wheel 76 and a pawl 77 pivotally mounted on a pawl shaft 78, shown in FIG. 4 supported between the plates 48 and 49. The detent assembly prevents rotation of the meter shaft 14 in an incorrect direction. A gear 79 is fixed to the lower end of the shaft 74 to provide the output thereof.

A second gear train shaft 81 is rotatably supported between the plates 45 and 49 and has gears 82 and 83 mounted for common rotation with the shaft 81. The gear 79 meshes with the gear 82. A third gear train shaft 85 carries gears 86 and 87 and gear 86 is drivenly meshed with the gear 83. The gear 87 meshes with a gear 88 forming an output of the system 23 that is fixedly mounted to a shaft 90 of the drum assembly 25 described in detail hereinafter.

Referring now to the drum assembly 25 as shown in FIGS. 3 and 4, the drum supporting shaft 90 extends in mutual parallel alignment with the shafts 74 and 81 and bearing pins at opposite ends of the shaft 90 are rotatably supported in the middle plate 49 and lower plate 64. The upper end of the shaft 90 carries the aforementioned gear 88 between the plates 45 and 49 and is driven in response to the gear train 23. The gear 88 may have one of a number of preselectable diameters for meshing with alternate gears carried on the shaft 85. The drum assembly shaft 90 further carries a gear 92 which is engaged by a rachet assembly 93 carried on a shaft 94 extending between the lower plate 64 and main plate 45. The gear 92 is engageable by the rachet assembly 93 to prevent rotation in one direction while permitting free rotation in the other so that pulses will not be generated erroneously.

Rotation of the input gear 73 of the gear train system 23 by the meter shaft 14 produces a desired ratio of rotation of the drum assembly shaft 90 relative to the shaft 14 and, accordingly, the selected ratio of rotation of the reflecting segments 28 and 29 in accordance with the gear ratio Pg. The gears on the shafts of the gear train system and the gear 88 of the drum shaft 90 may be interchanged to provide various combinations of alternate gear ratios to in turn provide different desired values of the gear ratio Pg. It has been found that values of Pg from values of five to one to a practical limit of two to one produce substantial frictional loading on the meter shaft so as to limit the permissible available values of Pg to greater approximately the five to one range The maximum friction loading imposed on a meter at light load by a gear train system is illustrated in FIG. 14 on page 9 in the above-identified Instructional Booklet IL 42-950.4.

Referring now further to the details of the drum assembly 25, the cylindrical side surface 26 is formed by a hollow cylindrical part having a closed upper end supporting a hub 25 on top of which the gear 92 is secured by a retaining ring 96. The lower end of the hollow cylindrical part forming the cylindrical side surface 26 is open and receives a spacer tube 97 extending concentrically over the shaft 90 and is clamped against the closed end of the cylindrical member by a retaining ring 98. This maintains the cylindrical part defining the cylindrical side surface 26 on the shaft 90 between the retaining rings 96 and 98. Thus, secured, the drum assembly 25 is mounted to rotate the pattern of two rows of reflecting segments 28 and 29 when driven by the gear train system 23 in response to rotation of the meter shaft 14.

Before describing in further detail the pattern of reflective segments 28 and 29 and their operative relationship in the pulse initiator 12, the mounting of the sensing head 32 is hereafter described as shown in FIG. 4 and in FIG. 5 which is a bottom view of the FIG. 4. The sensing head 32 includes a housing 100 mounted in a vertical orientation so that the source-pickup pairs 33S and 33P and 34S and 34P are oriented as described in connection with the FIG. 7 on a vertical axis parallel to the cylindrical side surface 26 and in a close spacing thereto within a diametrical plane including the shaft 90. A pair of hexagonal posts 101 and 102 each has the opposite ends thereof internally threaded so as to receive screws 103 and 104 which are applied through the bottom plate 64 to secure the hexagonal posts thereto. The housing 100 includes two laterally extending mounting arms 108 and 109 which are anchored to the tops of the posts 101 and 102 by screws 111 and 112. Accordingly, the mounting arms 108 amd 109 support the sensing head housing 100 in a cantilevered fashion so that the source-pickup pairs 33S–33P and 34S–34P are each aligned so as to register with substantially the centers of one and the other of the two rows of reflecting segments 28 and 29. The mounting arrangement of the housing 100 permits easy removal from the remainder of the pulse initiator for inspection and service of the solid state circuitry including the source-pickup pairs contained within the housing 100. The source-pickup pairs 33S–33P and 34S–34P and the associated solid state circuitry are mounted in the housing 100 and are made in accordance with the description of the aforementioned U.S. Pat. No. 3,733,493, in the preferred embodiment.

Referring now to the reflective patterned drum assembly 25 and to the arrangement of the two rows of reflecting segments 28 and 29 as shown in FIGS. 1, 3 and 4, the segments 28 and 29 are formed by a printing or a silk screening process by masking areas of the cylindrical side surface 26 so as to define two rows of reflecting segments 28 and 29. The remaining unmasked portion of the cylindrical side surface 30 is provided with a non-reflective coating such as by appropriate application of a black, dull finish ink, paint or lacquer. Since the cylindrical side surface 26 has a polished metel finish prior to the coating process, the uncoated areas defining the segments are highly reflective. An important feature of this invention is that the segments 28 and 29 are provided by convex cylindrical reflecting surfaces supported by the drum cylindrical side surface so as to provide periodic optical paths for coupling the radiations emitted from the sources 33S and 34S to the pickups 33P and 34P, respectively. The number of segments in each row may be varied within the requirements of first, that the area of each reflecting segment must be sufficient to reflect a minimum quantum of radient energy to activate the pickups 33P and 34P. The pickups must be activated for at least a minimum duration to render a conductive path through a relay pulse generating element described in the aforementioned U.S Pat. No. 3,733,493 to initiate an output pulse which is operative to produce data pulses over a telemetry system.

A second important requirement in forming the two rows of segments 28 and 29 is that the non-reflective spacing between the segments must be sufficient to provide a deadband interval effective to assure that each of the pickups 33P or 34P becomes deactivated for a minimum time lapse before the other pickup becomes activated. This assures that the circuit transient delay characteristics in the pulse initiating circuits have been completed to prohibit any possibility of the simultaneous actuation of the pickups 33P and 34P. In the case of an initiating circuit including a mercury wetted relay, noted in the aforementioned patent, the relay magnet causes the relay contacts to remain in a predetermined position as determined by the pulse initiator after one initiating circuit solid state switch has been turned off upon deactivation of a pickup. Current continues to flow temporarily due to the current decay characteristics in the relay coil. The cylindrical reflecting areas provided by the segments disposed on the cylindrical side surface 26 enhances the deadband spacing between each segment of one row and the adjacent segments of the of the other row. A deadband space allows time for the coil current to decay before a pickup activates a second solid state switch to conduct coil current in an opposite direction.

A third important consideration of forming the pattern of reflecting segments 28 and 29 in accordance with this invention is the prevention of undesired triggering of the pickings 33P and 34P due to spurious radiations from direct and reflected origins of radiations within the meter and pulse initiator assembly or as provided from outside the meter by ambient lighted conditions. In accordance with this latter consideration the cover 44 extends between the bottom plate 54 and the main plate 45 and is shown partially cutaway in FIGS. 3 and 4. The cover 44 is made of a thin sheet metal material either in one integral or two overlapping sections having arcuate ends which are curved inwardly for snapping over and resiliently engaging the spacer tubes 66, 67 and 68 as shown in FIG. 5. This substantially encloses the sides of the drum assembly 25 opposite the sensing head 32 while leaving the rear portion of the sensing head housing 100 exposed for access thereto and for the cabling 35. The snap-fitting arrangement due to the resiliency of the sheet metal cover 44 permits easy assembly and disassembly of a cover to the pulse initiator for inspection and repair.

Figure 6A:
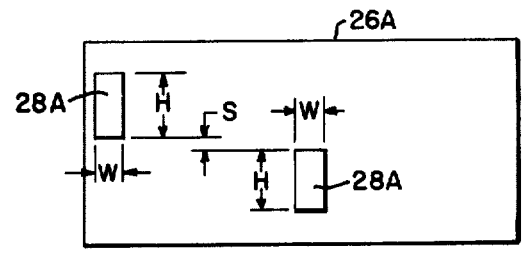
FIGS. 6A, 6B and 6C are developmental views of different pattern layouts for the drum assembly made in accordance with this invention.
Figure 6B:
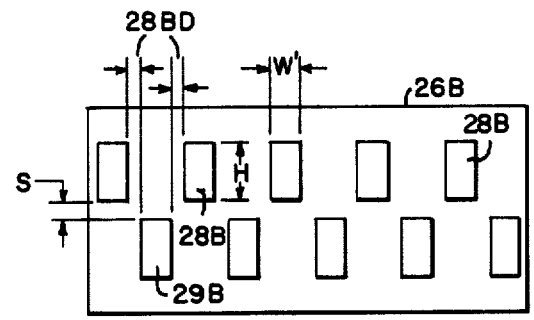
Figure 6C:
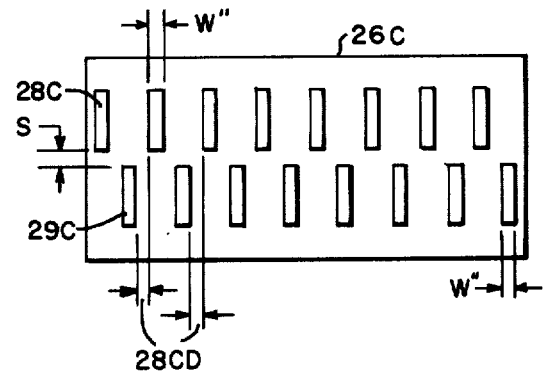

The FIGS. 6A, 6B and 6C show three development views of printing layouts of different numbers of reflecting segments which may be included in each of the two rows of segments 28 and 29 as shown in FIGS. 1, 3 and 4. Accordingly, the FIGS. 6A, 6B and 6C are equivalent to the development of cylindrical side surfaces designated 26A, 26B and 26C, respectively, having substantially identical sizes to each other and the cylindrical side surface 26. In the preferred embodiment illustrated in FIGS. 3 and 4 the drum cylindrical side surface 26 has a diameter in the order of 0.438 inch and a height in the order of 0.690 inch. Accordingly, the developments of the surfaces 26A, 26B and 26C shown at FIGS. 6A, 6B and 6C have a rectangular shape. In FIG. 6A is shown a two segment reflective pattern in which the rectangularly shaped segments 28A and 29A each have an elongated side having a height H in the order of 0.200 inch and a short side having a width W in the order of 0.100 inch. The distance S between the bottom of the segments 28A and the top of segments 29A is in the order of 0.05 inch. Segments 28A and 29A are oriented to be equally spaced circumferentially when the side 26A is formed as a cylinder and is included as part of the drum assembly 25 with the centers of each circular row aligned substantially with the source-pickup pairs 33S–33P and 34S–34P, respectively as shown in FIG. 1. Segments having the aforementioned dimensions of 28A and 29A can be provided in four, six, eight and 10 segment arrangements with equal numbers of segments in each row. Accordingly, in FIG. 6B is shown a side surface 26B including 10 segments with five segments 28B in one row and five segments 29B in a second row. The segments 28B of one row being equally spaced as are the segments 29B of the second row. The rows are staggered such that the segments of a given row are oriented in the center of the non-reflecting space between the segments of the adjacent row. As shown, deadband spacings 28BD are defined between the closest adjacent elongated sides of adjacent ones of the segments 28B and segments 29B. A deadband spacing in the order of 0.038, inch along the cylindrical surface has been found to be an optimum, minimum spacing for the particular embodiments of the source-pickup pairs utilized in the sensing head 32 and the associated pulse initiator circuitry and output pulse generator referred to herein.

Accordingly, 12 and 14 segment reflective patterns, not shown, have been made having reduced reflective areas and a 16 reflective segment pattern is illustrated in FIG. 6C. Sixteen segments have been found to be an optimum maximum number of reflective segments including eight segments 28C in one row and eight reflective segments 29C in the adjacent row for one working embodiment of the telemetry system 10. The width W of the segments 28C and 29C are in the order of 0.048 and a height H of 0.200 inch as provided for the other reflecting segments. Segments 28C and 29C are arranged equally spaced in the staggered rows relationship as described hereinabove and are provided with a deadband spacing 28CD in the order of 0.038 inch.

In accordance with the operation of the pulse initiator 12 as shown in FIG. 1, electrical power flowing in the conductors 18 and 19 rotates the meter shaft 14. The accumulated number of shaft rotations are indicated by the pointers 21 in accordance with the meter Kh constant (kilowatt hours per shaft resolutions). Rotation of the shaft 14 drives the gear train system 23, having a predetermined gear ratio Pg, to rotate the drum assembly 25 at a predetermined rate relative to the speed of the shaft 14. The number of segments 28 and 29 provide the number of rotating reflecting segments S in each row such that the values of Kh, Pg and S determine the pulse rate of the output pulses from the pulse initiator 12. These output pulses represent a value of kilowatt hours when produced by the rotation of segments 28 and 29 past the source-pickup pairs 33S–33P and 34S–34P in accordance with the formula relationships described hereinabove.

Figure 7:
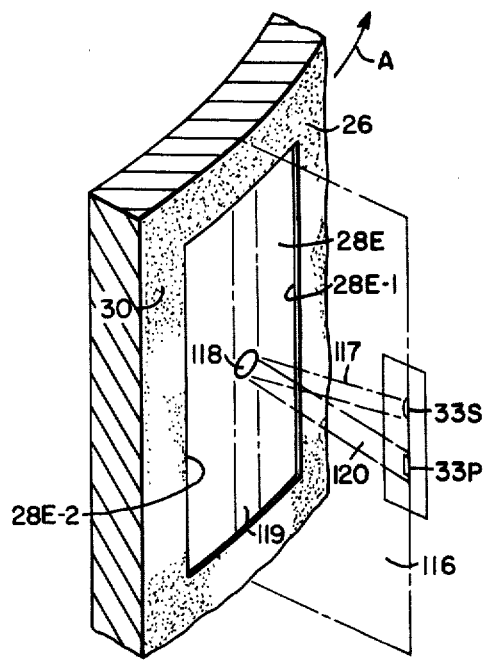
FIG. 7 is a diagrammatical view of a fragmentary portion of the patterned drum assembly illustrating the orientation of a radiation source-pickup pair relative to a reflecting segment of the drum for a better understanding of the invention.

The manner of effecting periodical optical coupling between the source-pickup pairs 33S and 33P and 34S and 34P is illustrated diagrammatically in FIG. 7. For example, a typical reflecting segment 28E is shown having the dimensions and is disposed in a predetermined pattern as described for one of the patterns shown in FIGS. 6A, 6B and 6C. The segment 28E is rotated as indicated by the directional arrow A. The segment 28E has a convex contour conforming to the cylindrical side surface 26. A source 33S has emitted radiations 117 so that as the leading edge 28E–1 is first aligned along the vertical diametrical plane 116 of surface 26, within which the source 33S and pickup 33P are positioned so that thereafter the radiations 117 from the source 33S are incident upon the segment 28E at a spot 118 defining a narrow convex segmental cylindrical portion 119 of the segment 28E. The portion 119 progresses from the edge 28E–1 to the trailing edge 28E–2 of segment 28E as the side surface 26 is rotated to couple the source emitted radiations 117 through reflected radiations 120 to the pickup 33P. It is believed the convex contour of the segment 28E causes a slight divergence in the reflected radiations 120 which slightly decreases the efficiency of the optical coupling path through which the emitted and reflected radiations 117 and 120 travel. It is believed highly significant, even with the decrease in efficiency due to the spreading of the reflected radiations 120, that the reflecting segments, as exemplified by the segment 28E, have a convex contour for selectively directing the emitted radiations 117 to the pickup 33P. This desirable selectivity in coupling the radiations from the source 33S to the pickup 33P is accomplished because only as long as the segmental portion 119 is passing along the plane 116 will the reflected radiations 120 be directed to the pickup 33P. Any of the emitted radiations which may strike the segment 28E other than when it is positioned in the plane 116 will be diverted away from the pickup 33P. This is especially important immediately before the leading edge 28E–1 reaches and the trailing edge 28E–2 passes the plane 116. This produces the sharp or substantially instantaneous activation and deactivation of the pickup 33P. This, in turn, permits a minimum deadband spacing S and increased numbers or reflecting segments possible on a given small diameter of the cylindrical side surface 26. The convex contour of the reflecting segments is further believed to produce the observed decrease instances of false triggering, i.e., activation of the pickups other than when a reflecting segment is positioned immediately adjacent the associated source-pickup pair. This reduced false triggering results because undesired reflected and extraneous radiations, from within or outside the meter, striking a reflecting segment are reflected away from a pickup. The highly directive and selective coupling is further aided by the close orientation of the source-pickup pairs relative to the side surface 26 made possible by the cylindrical contour being always equidistant from the source-pickup pairs 33S–33P and 34S–34P. This results in the emitted radiations 117 and reflected radiations 120 shown in FIG. 7 having to pass through very short distances to maintain control of the radiations. This decreases in the incident and reflected distances travelled by the Light radiations more than offsets the decrease in efficiency due to the aforementioned divergence in reflected radiations.

Accordingly, the drum assembly 25 affords an improved arrangement for rotating a reflective segmented pattern past the two pairs of radiation source-pickup pairs 33S-33P and 34S-34P in the improved pulse initiator 12. The improved arrangement requires a very small circular space to accommodate the diameter of the cylindrical side surface 26. The small diameter cylindrical surface 26 permits larger numbers of reflecting segments 28 and 29 than is possible with the prior larger diameter flat disk arrangements used to carry a rotatable reflective pattern. As noted, the radial spacings required between the segments of the patterned disks to provide sufficient deadband spacing and the minimum arcuate width required for the patterned disk segments to reflect the required quantum of radiations to a pickup requires a patterned disk diameter too large for practical use in a meter initiator when provided with the increased numbers of reflecting segments as described for the pulse initiator 12 made in accordance with this invention.

We claim:

1. Apparatus for producing pulses in a three wire remote meter reading telemetry system, comprising: an integrating meter including a frame and an electroresponsive movement carried by the frame and having an electromagnetically driven rotatable member, said member being rotated at a predetermined rate such that each rotation represents a fixed value of an electrical quantity measured by the meter; and a pulse initiator including a support assembly detachably mounted to said frame of the meter, a gear train system carried in said support assembly including input gear means and an output gear means wherein the output gear means has a predetermined gear ratio relative to the input gear means, said input gear means being rotatably coupled to said rotatable member, a drum assembly rotatably mounted on said support assembly for rotation by said output gear means, said drum assembly including a cylindrical side surface covered by a non-reflecting coating and having two staggered rows of a fixed preselectable number of convex cylindrical reflecting segments substantially equally circumferentially spaced by the non-reflecting coating, and sensing means including first and second radiation responsive source-pickup pairs mounted in said support assembly immediately adjacent said cylindrical side surface in optical register with said first and second rows of the reflecting segments, respectively, each of said pickups of the first and second pairs being alternately activated in response to alternately reflected optical coupling paths between the pickup and the associated source of each pair upon rotation of said drum assembly by the rotatable member such that the alternately activated pickups are effective to initiate pulses corresponding to predetermined quantized amounts of the measured electrical quantity as established by the predetermined rate of said meter, the predetermined gear ratio of said gear train system, and the preselected number of reflecting segments.

2. The apparatus as claimed in claim 1, wherein said support assembly includes plural vertically oriented plates having spacer tubes separating the plates, and wherein said gear train system includes a plurality of shafts mounted in vertical orientations such that separate ones of said shafts include the input gear means and intermediate gear means rotatably connected between the input and output gear means, and further wherein said drum assembly includes a shaft member rotatably mounted in two of said plates, with said shaft member supporting the cylindrical side surface and further supporting said output gear means.

3. The apparatus as claimed in claim 2, wherein the intermediate and the output gear means are adjustable to have different fixed gear values to establish a plurality of desired values for the predetermined mined gear ratio of the gear train system.

4. The apparatus as claimed in of claim 1, wherein the reflecting segments of said cylindrical side surface each have substantially identical rectangular convex cylindrical segment configuration wherein the width of each segment is established by the quantum of radiations of each source required to be reflected to an associated pickup, and further wherein the circumferential distance in which the non-reflecting coating separates a segment of one row and an adjacent segment of the other row is established by the minimum interval required to deactivate a previously activated pickup before the other previously unactivated pickup is activated.

5. The apparatus as claimed in claim 4, wherein the diameter of said cylindrical side surface is less than 0.5 inch and wherein said preselectable number of the segments in each of the rows is from one through eight.

6. The apparatus as claimed in claim 2, wherein the drum assembly and the sensing means are both positioned in said support assembly between two of the plates, and wherein a light shielding means extends between said two plates and along a substantial portion of the peripheral edges of each of said two plates so as to substantially surround said circumferential side surface and said sensing means and shield the optical coupling paths therebetween.

7. The apparatus as claimed in claim 4, wherein the associated meter includes a watthour meter and said rotatable member includes a vertical shaft carrying an electroconductive disk rotated at a predetermined rate of kilowatt hours per shaft revolutions, wherein said support assembly is attached to the frame part to position the support assembly forward of the vertical meter shaft and below said disk so that said input gear means meshingly engages a serrated portion of said shaft and the drum assembly shaft is positioned substantially parallel to said meter shaft.

8. The apparatus as claimed in claim 4, wherein said drum assembly includes an integral cylinder member having an apertured closed end receiving said drum assembly shaft and wherein the cylinder member has an exterior sidewall of a bright reflecting material and defines said cylindrical side surface, and further wherein said reflectings are formed by said exterior sidewall upon a non-reflecting coating material being applied to said sidewall except at the locations thereof defining said reflecting segments.

* * * * *